United States Patent [19]

Reedman et al.

[11] 4,192,033

[45] Mar. 11, 1980

[54] SHOE UPPER CONFORMING MACHINES

[75] Inventors: David C. Reedman, Skillington; Joseph A. Shutt, Rearsby; Alan M. Peck, Leicester, all of England

[73] Assignee: USM Corporation, Farmington, Conn.

[21] Appl. No.: 895,741

[22] Filed: Apr. 13, 1978

[30] Foreign Application Priority Data

Apr. 16, 1977 [GB] United Kingdom ............... 15876/77

[51] Int. Cl.² ............................................. A43D 21/00
[52] U.S. Cl. .................................................. 12/10.1
[58] Field of Search ......................... 12/10, 10.1, 10.5

[56] References Cited

U.S. PATENT DOCUMENTS

| 3,105,983 | 10/1963 | Deschenes et al. | 12/10.1 |
| 3,945,075 | 3/1976 | Vornberger | 12/10.1 |

Primary Examiner—Patrick D. Lawson
Attorney, Agent, or Firm—William F. White; Donald N. Halgren; Richard B. Megley

[57] ABSTRACT

A control system for a shoe upper conforming machine, more especially a pulling over and toe lasting machine, includes a computer control which supplies control signals sequentially, according to a programmed instruction, to actuating means for the various operating elements of the machine. In particular, the release of the grippers is controlled in relation to the movement of the wiper means.

Furthermore, the power supply to the actuating means for effecting gripping and pulling is independent of that for the actuating means for wiping over and securing the lasting margin to the insole, the arrangement being such that the power supply to the latter is operatively connected only after the operation of the former is completed.

13 Claims, 4 Drawing Figures

SHOE UPPER CONFORMING MACHINES

BACKGROUND OF THE INVENTION

This invention is concerned with improvements in or relating to shoe upper conforming machines, more especially so-called pulling over and toe lasting machines, that is machines in the operation of which a shoe upper can be tensioned (pulled) over a form (last) by the application of pulling grippers in the toe and forepart regions of the upper and thereafter the marginal portions of the upper (lasting margin) in the region of the toe and forepart are secured against appropriate surface areas of an insole held against the bottom of the form (last).

The word "shoe" where used herein is to be understood as referring to outer footwear generally and as including an article of outer footwear in the course of its manufacture.

There is hereinafter described in detail, to illustrate the invention by way of example, a so-called pulling over and toe lasting machine (hereinafter called the "illustrative machine"), this illustrative machine comprising a support by which a form, constituted by a last on which a shoe upper is to be conformed, can be supported, bottom down, with an insole held against the bottom thereof, gripper means, comprising a plurality of grippers spaced apart in relation to said support so as to enable marginal portions of the forepart of a shoe upper carried on a last supported by said support to be gripped, and means for effecting relative movement between said support and the gripper means whereby, with marginal portions of a forepart of an upper gripped as aforesaid, such upper can be tensioned over its last. For operating the grippers to grip an upper marginal portion as aforesaid, each gripper has gripper actuating means, in the form of a solenoid valve-controlled pneumatic piston-and-cylinder arrangement, associated therewith. Furthermore, for effecting relative movement between the support and the gripper means, each gripper has pulling means, again in the form of a solenoid valve-controlled pneumatic piston-and-cylinder arrangement, associated therewith, by which each gripper is moved downwardly relative to the support. Furthermore, said support is also moved upwardly, after the grippers have closed, also by support actuating means in the form of a solenoid valve-controlled pneumatic piston-and-cylinder arrangement.

In addition, the illustrative machine comprises a heel rest by which the end of the shoe remote from the end to be lasted, viz. the heel end, can be supported during the lasting operation, said rest being movable into and out of an operative (shoe heel engaging) position by means of heel rest actuating means again in the form of a solenoid valve-controlled pneumatic piston-and-cylinder arrangement. The heel rest actuating means is caused to operate after the grippers have been closed as aforesaid.

For causing the aforementioned operating elements to operate as aforesaid, the illustrative machine is provided with operator-actuatable means in the form of a foot-operated switch, a first operation of which is effective to cause a central or toe gripper to close and to move downwardly, thus to tension an upper gripped thereby. Release of the foot switch at this stage causes the toe gripper to open and to return upwardly to its initial position, e.g. if the operator is not satisfied with the position of the upper on its last.

With the upper satisfactorily positioned and gripped and tensioned by the toe gripper as aforesaid, further depression of the foot switch causes the remaining grippers to close and move downwardly, the support to move upwardly, and the heel rest to engage the shoe heel end.

In this position the illustrative machine comes to rest. The various operations described so far in relation to the illustrative machine are hereinafter called the "first stage operations". When these first stage operations are complete, the operator can then effect various discretionary operations to adjust the tension in the upper by suitable operator-actuatable means in the form of hand levers.

When the operator is satisfied that the upper is correctly positioned and tensioned, he initiates a further part of the operating cycle of the illustrative machine, either by releasing and again depressing the foot switch (in which case the release of the foot switch can be released at any time following the further depression thereof referred to the above), or merely by releasing the foot switch, according to the setting of a selector switch on a control panel of the machine. The former manner of initiating said further part of the operating cycle is referred to as "normal", and the latter as "high speed".

The illustrative machine comprises wiper means movable from a retracted position to an operative position in which an upper, tensioned over its last as aforesaid, can be held between the wiper means and an insole held against the last bottom. The wiper means comprises an wiper carrier which is movable by wiper carrier actuating means, in the form of a solenoid valve-controlled pneumatic piston-and-cylinder arrangement, in a so-called wiper head. The carrier carries two wiper members mounted for pivotal movement relative to one another and to the carrier, such pivotal movement being effected, by cam means secured on the wiper head, as the wiper carrier moves under the action of the wiper carrier actuating means as aforesaid.

The illustrative machine is a machine for carrying out so-called flat lasting operations, that is operations in which the marginal portions of a forepart are wiped under an insole held against the last bottom as aforesaid (as opposed to a so-called Veldtschoen outflanging operation in which the marginal portions are held against marginal portions of an upper surface of an insole which is of larger area than the last bottom for the purpose). For ensuring that an insole is held securely against the last bottom during movement of the wiper means to its operative position, and to prevent thereby the wipers from entering between the last bottom and the insole, the illustrative machine comprises a presser member movable, by presser member actuating means, again in the form of a solenoid valve-controlled pneumatic piston-and-cylinder arrangement, into and out of an operative, insole-engaging, position, in which an upper insole-engaging surface thereof lies in the plane of the aforementioned support, or substantially so.

In addition, the illustrative machine comprises a toe-engaging member in the form of a toe band which is mounted on the wiper head and is movable, by toe band actuating means again in the form of a solenoid valve-controlled pneumatic piston-and-cylinder arrangement, forwardly and downwardly, whereby to cause it to engage and wipe down the upper and hold it against the last in the region of the feather line at the toe end thereof, two pusher members being provided, one at either side of the last, for urging opposite end portions of the toe band into pressing engagement with the shoe. For moving the pusher members, each has associated therewith pusher member actuating means in the form of a solenoid valve-controlled pneumatic piston-and-cylinder arrangement.

The toe band serves to hold an upper in tensioned condition as the wiper means moves to its operative position, in timed relation with which movement at least some of the grippers are caused to open thus to release the marginal portions of the upper gripped thereby. (The timing of the opening of the grippers in relation to such movement of the wiper means is discussed in detail hereinafter).

The illustrative machine is adapted for performing cement lasting operations, that is to say the wiped-under marginal portions of the upper are secured to marginal portions of the insole contacted thereby by means of adhesive. More specifically the adhesive used is a so-called hot melt adhesive. The adhesive is applied between the marginal portions of the upper and of the insole prior to the upper marginal portions being wiped under as aforesaid. In the illustrative machine the presser member has formed, in its insole-engaging surface, a channel into which adhesive can be supplied, the arrangement being such that, with the preser member engaging an insole as aforesaid, adhesive supplied to the channel is thus applied to said insole. In the illustrative machine adhesive in rod form is used, the arrangement being such that feeding a portion of rod into a melt chamber of adhesive applying means of the machine is effective to cause molten adhesive to be supplied to said channel. For thus feeding rod adhesive, the illustrative machine comprises feed means in the form of an adjustable stroke solenoid-valve-controlled pneumatic piston-and-cylinder arrangement. Furthermore, melt chamber heater means is provided for heating the melt chamber to a temperature at which the adhesive will melt and be maintained in molten condition.

In addition, the wiper members are each provided with wiper member heater means for heating said members to a temperature appropriate for efficiently effecting a cement lasting operation.

In the operation of the illustrative machine, the movement of the wiper means is arrested in its operative position by a stop member, a switch being at the same time operated by an actuator therefor to cause the presser member actuating means to operate to move the presser member to an out-of-the-way position. Also at the same time, a solenoid valve is operated to admit air under pressure to the "exhaust" side of the piston-and-cylinder arrangement of the wiper carrier actuating means whereby to balance the pressures applied to both side of the piston thereof. The wiper members, which are holding the marginal portions of the upper against the insole, thus assist in holding the insole against the last bottom during the movement away of the presser member, so that any tendency of the adhesive to pull the marginal portions of the insole away from the last bottom is resisted. When the presser member has reached its out-of-the-way position, a further switch is operated to actuate stop member moving means whereby the stop member is removed from obstructing movement of the wiper means. At the same time, the solenoid valve admitting "balancing" air under pressure is de-energised and the movement of the wiper means can thus continue. During such continued movement, any grippers which had not previously been caused to open are caused so to open and release the upper gripped thereby. It is to be noted that none of the grippers is caused at this time to move upwardly to its initial condition, so as not to foul on the under-side of the wiper members.

When the wiper means reaches the full extent of its inwiping movement, bedding pressure is applied to the wiped-under marginal portions of the upper to secure them to the insole. To this end, the illustrative machine comprises bedding pressure applying means, comprising a so-called toe pad, which is moved downwardly into engagement with the toe portion of the shoe upper carried on its last, and a solenoid valve-controlled pneumatic piston-and-cylinder arrangement for so moving the toe pad. At the same time, the support moving means is caused to operate to move the support for the last downwardly out of engagement with the insole. In this condition, the shoe is supported by and inwiped marginal portions of the upper are pressed against, the wiper members.

This condition is maintained for a period determined according to the type of adhesive used and the properties of the upper and insole materials, being sufficient to ensure a proper bond between the upper and insole.

The various operations described, in relation to the illustrative machine, as being performed during the aforementioned further part of the operating cycle of the machine, are hereinafter called "second stage operations".

At the end of the period during which bedding pressure is applied, the various operating elements are sequentially returned to their initial condition, so that the shoe whose forepart is now lasted is released and the illustrative machine is ready for a next operation.

Machines for pulling over and cement toe lasting flat lasted shoes having the various operating elements described above, or common variants thereof, and operating in the manner described above, or in a generally similar manner, are well known and are commercially available. Such commercially available machines also comprises control means for controlling, in a desired sequence, operation of the actuating means for the various operating elements, the pulling means for the grippers, the rod feed means and the bedding pressure applying means (hereinafter referred to collectively as "the various actuating and like means"). Such control means, however, conventionally comprise micro-switches actuated sequentially by cam means carried by some moving part of the machine in combination with various operator-actuatable switches. In an alternative control system, the solenoid valves controlling the piston-and-cylinder arrangements and associated microswitches are replaced by trip valves themselves directly actuated by cam means in the same manner as the tripping of the microswitches as aforesaid. In either case, however, dirt and other injurious matter may affect the efficient operation of the switches or trip valves. More recently a so-called sold-state control circuit has been experimented with, but without complicated and expensive safety circuits to counter any possible malfunction of the components of the control circuit; the operator is put at risk in the initial handling of the shoe upper in the vicinity of the wiper members and the grippers.

BRIEF DESCRIPTION OF THE INVENTION

The illustrative machine therefore comprises control means for controlling, in a desire sequence, operation of the various actuating and like means, which control means comprises a microprocessor which supplies control signals sequentially, according to a programmed instruction corresponding to the desired sequence of operations, to said actuating and like means. In the illustrative machine, control signals are thus supplied to the solenoid of the valves by which the various pneumatic piston-and-cylinder arrangements are operated. It will, however, be appreciated that in other machines in accordance with the invention and otherwise similar to the illustrative machine, the various actuating and like means may be in the form of motor means other than pneumatic piston-and-cylinder arrangements, and control signals can be similarly supplied thereto in an appropriate manner from the microprocessor.

The use of a microprocessor in the control circuitry of the illustrative machine achieves both greater reliability in operation and also provides a higher level of safety for the operator. To this end, each control signal supplied by the control means to a solenoid is passed via an amplifier, the output (to the solenoid) of which is monitored, through a feedback to the microprocessor, so that failure of an amplifier to function as instructed is sensed within, say, 20 milliseconds of such failure occurring. In the event of such a failure being sensed, a mail control relay, by which the power supply to the various actuating and like means is controlled, is de-actuated by a "de-actuate" signal from the microprocessor, whereupon the operating cycle of the illustrative machine is arrested and the various operating elements are returned to their initial condition.

Furthermore, in order to assist in the "diagnosis" of a failure, the illustrative machine is also provided with a digital display panel having an indicator for each solenoid, the appropriate indicator being displayed when a control signal is to be supplied to any such solenoid, and such appropriate indicator remaining so displayed in the event of an amplifier failure and the consequent return of the various operating elements to initial conditions as aforesaid. An operator or mechanic will be provided with a code-book or the like from which, by means of the displayed indicator, he will be able to identify the faulty amplifier and rectify the fault.

The control means of the illustrative machine is arranged to supply an "interrupt" signal to the microprocessor at regular intervals of say, 10 milliseconds. Upon receiving such a signal, the microprocessor executes a sub-programme by which the state of each amplifier is checked against the instruction as to state. In the event of the actual state differing in two successive checks from the instruction as to state, the main control relay is de-actuated as aforesaid. The "interrupt" signal is supplied from an electrical control circuit which forms part of the control means of the illustrative machine and in which the main control relay is incorporated. This circuit has a rectified a.c. supply giving a mean voltage of about 24 volts. The "interrupt" signal is taken from said supply but the "peaks" thereof are clipped to give a maximum voltage of about 10 volts. Each "interrupt" pulse is timed to coincide with the maximum supply voltage, so that the checking of each amplifier as to its state coincides with the availability of full voltage to its associated solenoid.

The "interrupt" signal is, furthermore, effective to cause the operation of the microprocessor itself to be monitored. To this end, the control means comprises a timer device which is operatively connected to the main control relay. This timer device is arranged to time out after a fixed period, say 12 to 15 milliseconds. The microprocessor is programmed to "refresh" this timer device upon receipt of each "interrupt" signal, that is every 10 milliseconds. Failure of the microprocessor to respond to an "interrupt" signal, therefore, will cause the main control relay to be de-actuated as aforesaid.

By way of a further safety arrangement, the electrical control circuit is so arranged that the power supply required for putting into effect the first stage operations is independent of that required for putting into effect the second stage operations, and that the power supply for the second stage operations cannot be switched on until the completion of the first stage operations. Furthermore, each such power supply is independent of the amplifiers through which control signals are passed to the solenoids supplied from the power supplies. Thus, if e.g. an amplifier associated with a second stage operation malfunctions during the first stage operations, there will be no power supply to the solenoid associated with the malfunctioning amplifier and thus no risk to the operator from an unexpected operation of moving parts of the machine.

Thus, during the insertion of marginal portions of the upper into the open grippers and during the gripping and pulling operations, the wiper means, toe band and toe pad are all prevented from advancing into the operating locality when the operator is manipulating the work with his hand. In addition, the wiper means and other "second stage operation" means cannot be operated by a machine fault before the operator is satisfied that the upper is properly pulled over and held tensioned. Furthermore, although the power supply is made available by the actuation of various relays in the elctrical control circuit, the actual sequencing of the operation of the various actuating and like means is controlled by control signals from the microprocessor.

The sequencing of the control signals is achieved partly by the programmed instruction. Thus, where there is no requirement for adjusting the timing of operations relative to one another, the sequence can be satisfactorily incorporated into the programme. Where, however, the sequencing has to be adjusted according to a style of shoe being operated upon, it is considered unnecessarily complicated and expense-incurring to provide different programmed instructions. To provide for adjustable operation sequencing, therefore, especially with regard to the movement of the wiper means from its retracted to operative position, and the timing of the opening of the grippers in relation to such movement, the control means of the illustrative machine comprises a signalling device associated with the wiper carrier, which device is arranged to emit a signal having a value which varies proportionately with the distance through which the wiper carrier moves, and also a plurality of reference signalling devices, one associated with each gripper for the gripping means, each such device being arranged to emit a signal of constant value, but such value being adjustable by the operator in a setting up operation. In the operation of the illustrative machine, the micrprocessor operates to compare the value of the signal of the signalling device with the value of each signal from the reference signalling devices and, in response to a matching of such values, to operate the gripper actuating means associated with the "matching" reference signalling device thus to cause the gripper to be opened and the marginal portion of an upper gripped thereby to be released.

The micrprocessor thus acts as a comparator for the signal values. In order to present the signals to the microprocessor in a form comprehensible to the microprocessor, the control means also comprises an analog/digital converter which converts the signals from the devices, in the form of voltages, into signals in binary form. These can then pass, as do other signals to outputs and form other inputs, along a main data bus of the control means to the microprocessor.

The signalling device associated with the wiper carrier is constituted by a linear transducer (potentiometer) operatively connected to the wiper carrier. Similarly the reference signalling devices are constituted by manually adjustable transducers (potentiometers). Access to these latter, for adjustment purposes, is through the control panel of the illustrative machine.

The microprocessor of the control means of the illustrative machine is also utilized for controlling the heating means for the melt chamber for the adhesive, by sensing the temperature thereof. The sensing is effected by means of a thermocouple which signals the analog/digital converter, the signal being converted thereby and passed to the microprocessor in the manner aforementioned. The heating means for the melt chamber is incorporated in a 240 volt circuit incorporating also a set of contacts of a heater control relay in the control circuit. Thus, if a signal de-actuating the main control relay is supplied, the heater control relay becomes deactuated also. Thus in the event of a failure in machine operation, the melt chamber heater means is switched off.

In the illustrative machine, the heater means for the wiper members is under the control of a simmerstat; provision could however be made for controlling it by the microprocessor also.

If desired, provision may also be made for using the digital display unit for assisting in adjustment of the reference potentiometer settings and also of said microprocessor-controlled temperature controls, where these are adjustable.

The programmed instruction is in the form of a PROM (programmable read only memory). Because of the facility to make "style adjustments", viz. modifications to the sequence of the operations dictated by shoe styles, outside the PROM, a single PROM can be used for a wide range of styles. Also by interconnection of microprocessor control and electrical control circuitry, and also by the monitoring facility of the microprocessor, the machine is rendered more safe to operate. Further the microprocessor is less subject to unreliability due to external causes, e.g. dirt, than the control systems previously used.

Whereas the illustrative machine is provided with microprocessor control, other machines otherwise similar to the illustrative machine may be provided with other computer controls having a programming facility. However, the microprocessor is preferred in that it is extremely compact, readily replaceable and relatively inexpensive.

The invention provides, in one of its several aspects, a shoe upper conforming machine comprising—(i) a support by which a form, on which a shoe upper is to be conformed, can be supported with an insole held against the bottom thereof; (ii) gripper means including a plurality of grippers each operable to grip a marginal portion of a shoe upper carried on a form supported by said support; (iii) means for effecting relative movement between said support and the gripper means whereby, when the machine is in use and marginal portions of a shoe upper are being gripped as aforesaid, such upper can be caused to be tensioned over the form; (iv) wiper means movable from a retractable position into an operative position in which, when the machine is in use, an upper tensioned as aforesaid can be held between the wiper means and an insole held against the bottom of the form; (v) actuating means for causing the wiper means to move between said positions as aforesaid; (vi) gripper actuating means for operating each gripper to close to grip a marginal portion of a shoe upper as aforesaid; and (vii) control means for controlling operation of both the actuating means for the wiper means and also the gripper actuating means, whereby the wiper means is caused to move from its retracted to its operative position and, when the machine is in use and with marginal portions of a shoe upper gripped and the upper tensioned as aforesaid, the grippers are caused to release such upper in timed relation with such movement of the wiper means, said control means comprising a computer control which supplies control signals sequentially, according to a programmed instruction, to the actuating means for the wiper means and to the gripper actuating means.

The invention also provides, in another of its several aspects, a shoe upper conforming machine comprising—(i) a support by which a form, on which a shoe upper is to be conformed, can be supported with an insole held against the bottom thereof; (ii) gripper means including a plurality of grippers each operable to grip a marginal portion of a shoe upper carried on a form supported by said support; (iii) means for effecting relative movement between said support and the gripper means whereby, when the machine is in use and marginal portions of a shoe upper are being gripped as aforesaid, such upper can be caused to be tensioned over the form; (iv) wiper means movable from a retractable position into an operative position in which, when the machine is in use, an upper tensioned as aforesaid can be held between the wiper means and an insole held against the bottom of the form; (v) actuating means for causing the wiper means to move between said positions as aforesaid; (vi) gripper actuating means for operating each gripper to close to grip a marginal portion of a shoe upper as aforesaid; and (vii) control means for controlling operation of the gripper actuating means, to cause the grippers, when the machine is in use, to release marginal portions of a shoe upper gripped as aforesaid, in timed relation with operation of the actuating means for the wiper means, by which the wiper means is moved from retracted to operative position, said control means comprising—(a) a signalling device associated with the actuating means for the wiper means, said device being arranged to emit a signal having a value which varies proportionately with the distance through which the actuating means for the wiper means moves to move the wiper means as aforesaid; (b) reference signalling device associated with the gripper actuating means, each such device being arranged to emit a signal of constant value; and (c) a comparator which operates to compare the value of the signal of the signalling device with the values of the signals from the reference signalling devices and, in response to a matching of values of the signal from a reference signalling device with the signal from the signalling device, to actuate the gripper actuating means associated with such reference signalling device, thus to cause the gripper associated therewith to release the marginal portion of a shoe upper gripped thereby.

The invention further provides, in another of its several aspects, a pulling over and toe lasting machine comprising—(i) a last support by which a last, on which a shoe upper is to be conformed, can be supported, bottom down, with an insole held against the bottom thereof; (ii) gripper means, including a plurality of grippers spaced apart in relation to the last support so as to enable marginal portions of the forepart of a shoe upper carried on a last supported by the last support to be gripped; (iii) means for effecting relative movement between the last support and the gripper means whereby, with marginal portions of an upper forepart gripped as aforesaid, such forepart can be tensioned over its last; (iv) wiper means movable from a retracted position into an operative position in which an upper, tensioned over its last as aforesaid, can be held between the wiper means and an insole held against the last bottom; (v) a presser member movable relative to the last support to hold the insole against such last bottom during the movement of the wiper means as aforesaid; (vi) actuating means for causing the wiper means to move into operative position as aforesaid; (vii) gripper actuating means for causing each gripper to close whereby the marginal portion of an upper inserted therein can be gripped as aforesaid; (viii) pressure member actuating means for moving the presser member to engage and hold an insole as aforesaid; and (ix) control means for controlling operation of the actuating means for the wiper means, the gripper actuating means and the presser member actuating means in a desired sequence, whereby with marginal portions of an upper forepart gripped and the upper thus tensioned as aforesaid, the presser member is caused to engage and hold the insole against the last bottom, and, as the wiper means moves into operative position, the grippers are caused to release the upper in timed relation with such movement of the wiper means, said control means comprising a computer control which supplies control signals sequentially, according to a programmed instruction corresponding to the desired sequence of operations, to said actuating means for the wiper means, the gripper actuating means and the presser member actuating means.

The invention still further provides, in another of its several aspects, a pulling over and toe lasting machine comprising a last support by which a last, on which a shoe upper is to be conformed, can be supported, with an insole held against the bottom thereof, first operating means whereby marginal portions of a shoe upper carried on a last can be gripped and such upper be tensioned over such last, second operating means whereby, with the upper tensioned as aforesaid, the marginal portions thereof can be wiped over marginal portions of an insole held against the last bottom as aforesaid and secured thereto, and control means whereby the operation of the second operating means is prevented from being initiated until the operation of the first operating means is completed, said control means comprising a computer control which supplies control signals sequentially, according to a programmed instruction corresponding to a desired sequence of operations, to various actuating means for the operating elements of both the first and the second operating means, and further said control means comprising an electrical control circuit which provides separate power supplies to the first and second operating means, and which is so arranged that the power supply to the second operating means is operatively connected to said second means only after operation of the first operating means is completed, regardless of any control signal passed to the actuating means for any operating element of said second operating means prior to completion of the operation of the first operating means.

DESCRIPTION OF THE DRAWINGS

The various objects and the above and other of the several aspects of the invention will become clearer from the following detailed description, to be read with reference with the accompanying drawings, of the illustrative machine, which, it will be appreciated, has been selected for description merely by way of exemplification of the invention and not by way of limitation thereof.

In the accompanying drawings.

DETAILED DESCRIPTION OF THE INVENTION

The illustrative machine is, as aforementioned, a pulling over and cement toe lasting machine for flat work and comprises the various operating elements referred to hereinbefore, said elements being operated by the various actuating and like means also referred to hereinbefore.

The operation of the illustrative machine will therefore now be described with reference to the circuitry shown in the accompanying drawings.

Figure 1:
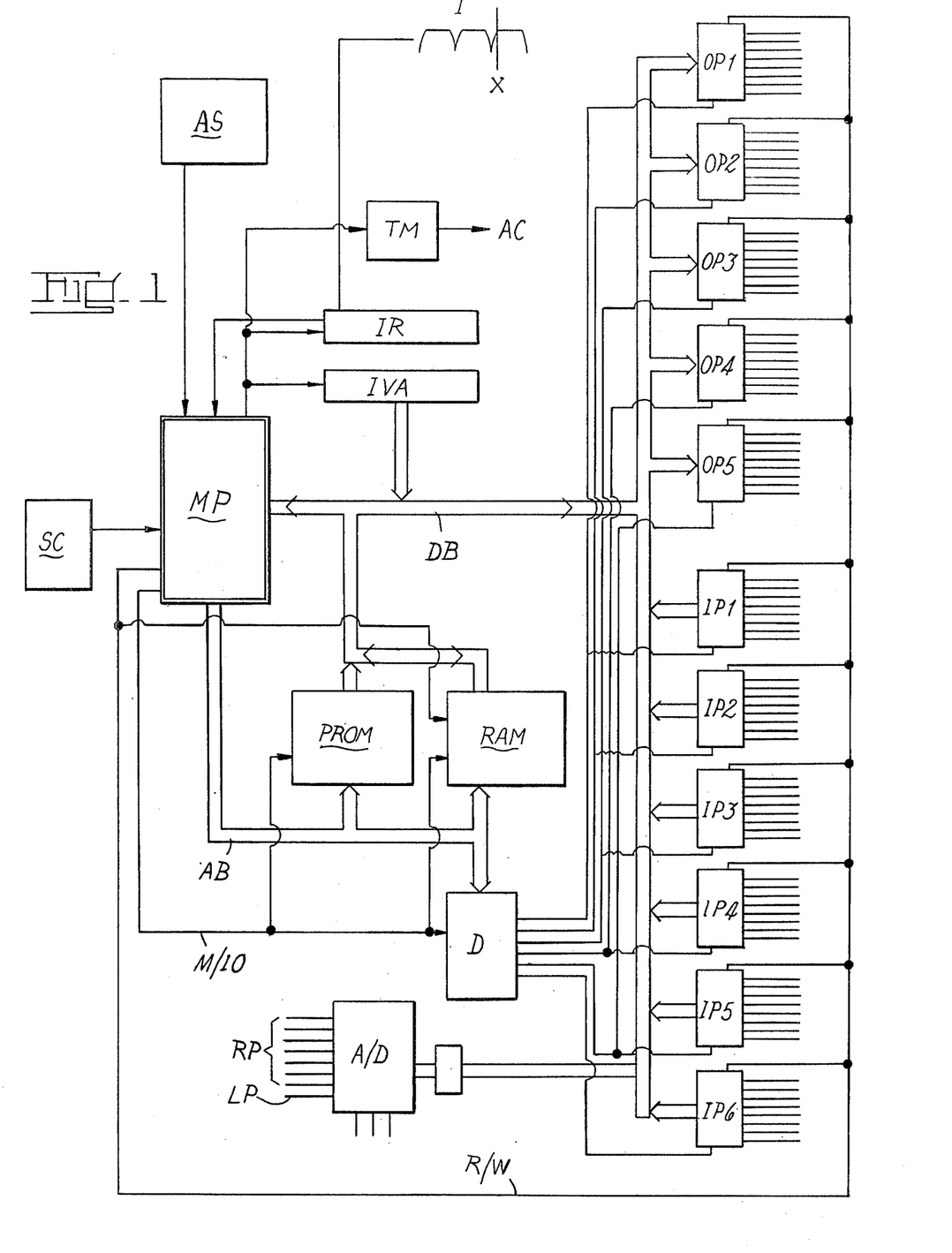
FIG. 1 is a diagram of a control circuit of the illustrative machine, incorporating a microprocessor and input and output ports operatively connected thereto, including a PROM.

Viewing FIG. 1, MP represents a microprocessor and DB a data bus along which information can be fed from and to the microprocessor from output ports OP 1 to 5 and input ports IP 1 to 6 respectively. In addition, the control circuit includes a PROM which can be addressed by the microprocessor along address bus AB and which in turn feeds data into the data bus DB. In addition, the microprocessor can address a so-called "scratch pad" RAM, said scratch pad being capable of having information passed thereto from the PROM, and further being capable of feeding information into the data bus DB. Again, the microprocessor can, through a decoder D, address each one of the output and input ports individually, a read/write signal being sent from microprocessor MP along a line R/W to the output and input ports for this purpose. In addition, microprocessor is connected to the PROM and the RAM and decoder D by a further signal line M/IO, which signals whether information is to be transferred into or out of memory or alternatively from an input or to an output port.

The control circuit of FIG. 1 also shows a system clock SC and an automatic start-up device AS by which activity of the microprocessor MP can be initiated.

In the operation of the illustrative machine, the various actuating and like means are caused to operate in a desired sequence under the control of the microprocessor as it "reads" through the programmed instruction provided by the PROM.

In carrying out a cycle of operation of the illustrative machine, the operator first inserts marginal portions of the forepart of a shoe upper carried on a last supported by the last support 20 into the open jaws of the grippers 22. At this time, an amplifier AC (see FIG. 2) is active, so that main control relay RC is held actuated, through its own holding contacts RC/1. Actuation of relay RC/1 also causes its contacts RC/2 to be closed, whereby a power supply is made available to the remainder of the electrical circuit. Activation of amplifier AC will be described hereinafter.

Figure 2:
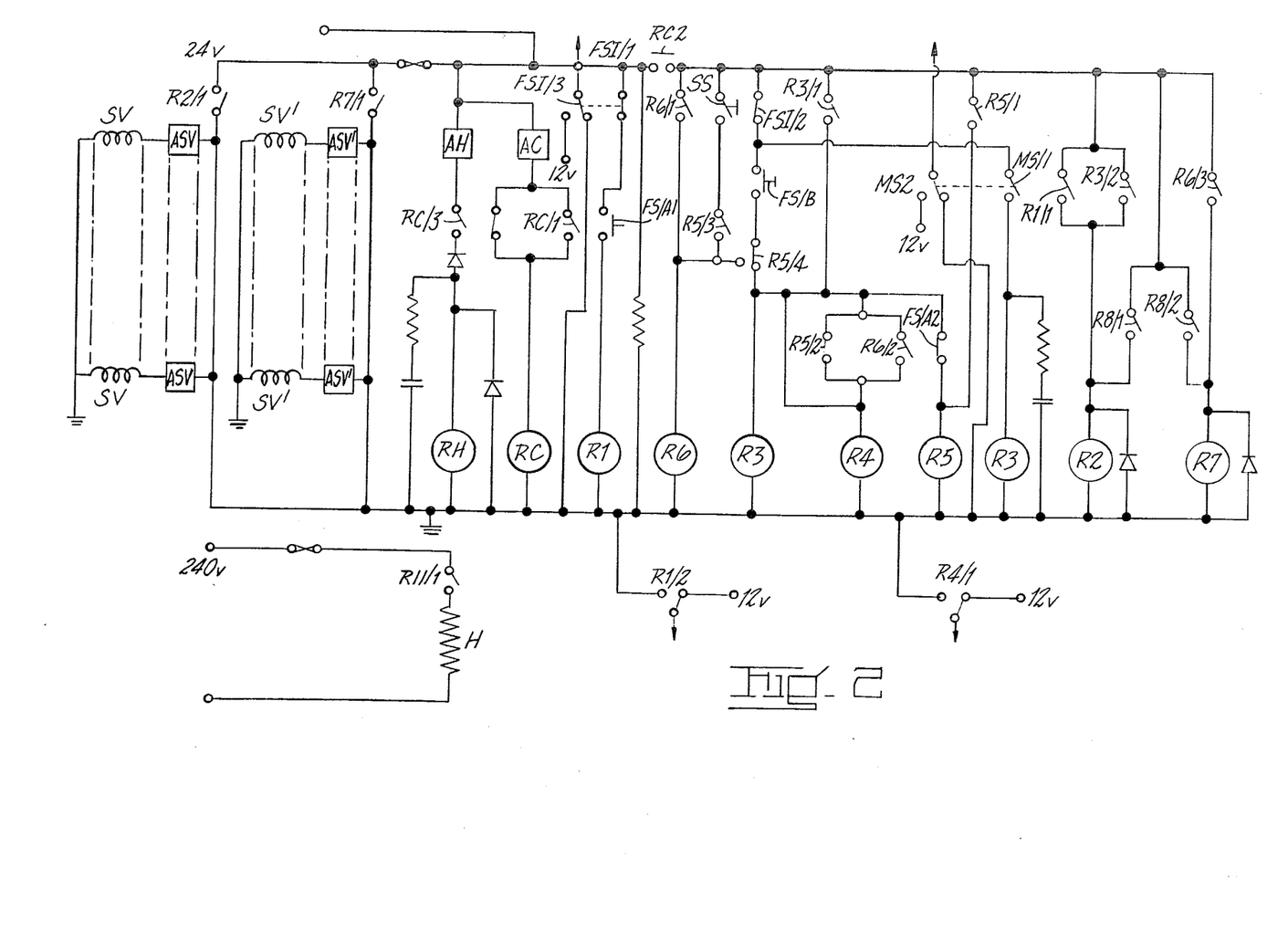
FIG. 2 is a diagram of an electrical control circuit of the illustrative machine.

To initiate a cycle of operation, the operator actuates a foot switch FS. This switch has first and second operative positions in which first and second sets of contacts A, B are actuated. The A set of contacts comprises normally open contacts (1) and normally closed contacts (2). Depressing the foot switch FS to its first operative position causes contacts FS/A1 to be closed, thereby actuating relay R1, contracts R1/1 of which are thereupon closed, energizing relay R2. At the same time, contacts R1/2 are closed, whereupon a signal is supplied to the microprocessor MP to indicate that the foot switches FS is in its first operative position.

Energizing relay R2 closes contacts R2/1, thereby making available a power supply to a plurality of solenoid SV associated with the various actuating and like means for carrying out the aforementioned "first stage operations". These operations, as aforementioned, are essentially associated with the gripping and tensioning (pulling) of the upper over its last. With the power supply thus made available, the operation of the vairous solenoids SV is effected under the control of associated amplifiers ASV which are operated in a desired sequence by control signals supplied from the micrprocessor through the output ports OP. The desired sequence is determined by the PROM, although some adjustment of the sequence of pulling can be made by means of a selector switch 24 on the control panel 26 of the machine.

In the operation of the machine, the first depression of the foot switch FS is effective to cause only a central toe gripper 22 to close and pull on the upper, thereby tensioning the upper appropriately lengthwise of the shoe. At this stage, release of the foot switch would cause the contacts A1 thereof to open thereby discontinuing the power supply of the solenoids SV, so that the toe gripper is opened and restored to its initial condition, thereby releasing the upper.

With the toe gripper gripping the upper and tensioning it to the satisfaction of the operator, the operator then depresses the foot switch FS to its second operative position, thereby closing contacts B thereof, whereupon relay R3 is actuated. Energizing relay R3 closes contacts R3/1 thereof to form a holding circuit and also closes contacts R/2 thereof to form a holding circuit for relay R2. In addition, closing contacts R3/1 is effective to energize relay R4, whereupon, through contacts R4/1, a signal is supplied to the microprocessor MP to indicate a first operation of the B contacts of the foot switch.

The shoe is now in a condition of being gripped and tensioned on its last in readiness for the aforementioned second stage operations to be performed thereon, with heel rest 36 engaging the heel end of the shoe. In this condition, the machine comes to rest. The next part of the operating cycle depends upon the condition of selector switch SS, by which either a "normal" or "high speed" operation can be selected. In FIG. 2, a "normal" operation has been selected, so that release of the foot switch FS at this stage merely maintains the upper gripped and tensioned as aforesaid, since relay R3 is held actuated by holding contacts R3/1, and relay R2 is held actuated by contacts R3/2, so that the power supply to the solenoid SV is maintained available.

Upon release of the foot switch FS, normally closed contacts A2 thereof are closed thereby energizing relay R5, whereupon contacts R5/1 are closed to form a holding circuit, contacts R5/2 are opened, thereby de-energizing relay R4 (thus removing the signal via contacts R4/1 to the microprocessor), contacts R5/3 are closed (but, since the switch SS is open, closing R4/3 is of no effect), and contacts R5/4 are switched thereby making a path to relay R6, which path however, is broken by the contacts FS/B.

The operator then trips the foot switch FS to its second operative position once more, thereby energizing relay R6, holding contacts R6/1 of which are then closed, and further contacts R6/2 are closed, thereby re-energizing R4, whereupon a further signal is passed to the microprocessor through contacts R4/1. Energizing R6 also closes contacts R6/3 whereupon relay R7 is energized, thereby closing R7/1 through which a power supply is made available to the solenoid SV' of the various actuating and like means by which the second stage operations aforementioned are carried out. Once relay R7 is energized, the sequence control of said second stage operations is under microprocessor control through associated amplifiers ASV', to which signals are fed through the various output ports OP. The second stage operations involve the application of adhesive to the marginal portions of the insole by insole presser member 38, the forward and down wiping movement of the toe band 34, in-wiping of the marginal portions of the upper by wipers 28, and the application of bedding pressure by toe pad 32 as described above.

If the selector switch SS is switched to its "high speed" condition, on the other hand, relay R6 will be energized upon closure of contacts R5/3, which closure takes place upon release of the foot switch FS and the restoration of its contacts A2 to a closed condition, whereby relay R5 is energized. The operating cycle then takes place in the same manner as in a "normal" operation.

As the wipers 28 of the illustrative machine effect an in-wiping movement, through a rectilinear movement of the wiper carrier, the various gripper means 22 are required to release their grip on the marginal portions of the upper in timed relation with the in-wiping movement of the wipers. In the illustrative machine, it is desired that the sequence of release by the grippers can be adjusted according to the style of the shoe being operated upon. To this end, it is not desirable that the release of the grippers is written into the sequence of the programmed instruction specifically, but rather that independent signalling means can be provided, which the microprocessor can scan at frequent intervals, namely of 10 milliseconds, and which can be adjusted by the operator according to the style of shoe.

In the illustrative machine, therefore, associated with each solenoid of the gripper actuating means is a potentiometer RP which can emit a reference signal in the form of a voltage which can be pre-set. And similarly, a signalling device in the form of a linear potentiometer LP is associated with the wiper carrier, said device being arranged to emit a signal having a value which varies proportionately with the distance through which the wiper carrier moves to move the wiper members as aforesaid. The signal from the linear potentiometer is also in the form of a voltage.

For converting the voltage signals into signals comprehensible to the microprocessor MP, the control circuit comprises analog/digital converter A/D which converts the "voltage" signals into digital form and passes them along the data bus DB.

In the operation of the illustrative machine, the microprocessor compares the value of the signal from the linear potentiometer at regular intervals with the value of the reference potentiometer signals and, when the linear potentiometer signal matches a reference potentiometer signal, the microprocessor outputs through the appropriate output port OP to the amplifier ASV associated with the solenoid SV with which the reference potentiometer whose signal is matched is associated, whereupon the gripper which is actuated by the solenoid in question is caused to open thereby releasing the upper marginal portions gripped thereby.

It will thus be appreciated that the operator can set the reference potentiometers in such a manner that the sequence of release can be adjusted according to the style of shoe and in timed relation with the movement of the wipers to their operative position.

For setting up the illustrative machine, a manually operable switch MS is provided. Closure of "1" contacts of MS causes relay R8 to be actuated, contacts R8/1 and R8/2 being there upon closed to energize relays R2 and R7. In this way, power supplies are made available to the first and second stage operation solenoids SV, SV' and the machine can therefore cause the grippers to close and move downwardly and also to cause the wipers to move into their fully in-wiped condition. "2" contacts of the switch MS are also switched to provide a signal to the computer, thereby initiating the sequencing of operation of the amplifiers ASV, ASV'.

The electrical control circuit of the illustrative machine also comprises a manually operable foot switch inhibitor switch FSI, having three sets of contacts. This switch can be operated by the operator at anytime during an operating cycle. If it is operated before the operating cycle is initiated by the first depression of the foot switch FS, relay R1 is prevented from being actuated, so that a cycle of operation cannot begin. If the foot switch has been moved to its second operative position, and the B contacts are thereby closed; subsequent operation of the inhibitor switch will not return the machine to its original condition, but rather will prevent any further part of the operating cycle from taking place, since relay R6 cannot be energized, because the "2" contacts of the inhibitor switch are opened. The "3" contacts of the inhibitor switch as a signal to the microprocessor MP to indicate its operation.

The electrical circuit also serves to pass a pulsating "interrupt" signal I to the microprocessor, this signal being received by interrupt receiver 1R which supplies a signal to the microprocessor. The signal has "shape" (see FIG. 1) of a rectified wave form of the "peaks" of which have been clipped. Furthermore, the "interrupt" signal is received by the receiver 1R at a point where the voltage of each pulse reaches a maximum (indicated in FIG. 1 by the line X). The frequency of the signal is in the order of 1 each 10 milliseconds.

On receipt of the signal, the microprocessor "acknowledges" by a return signal to 1R, and also signals an interrupt vector address IVA which in turn puts a signal on the data bus DB. In addition, the microprocessor supplies a "refreshing" signal to a timer TM, having a timing out period in the order of 12 to 15 milliseconds. Failure to refresh the timer causes a signal to be passed to amplifier AC, with a result that main control relay RC is de-energized and the operation of the machine is terminated and the machine is returned to its initial condition.

In passing, other "disabling" signals can be passed to the amplifier AC by the microprocessor; for example, in the event of a feedback signal via input ports IP indicating that an amplifier ASV (or ASV') has failed to operate as instructed by the microprocessor, or again in the event of an emergency stop knee-operated switch (not shown) being operated by the operator.

The microprocessor is also utilized to control heater means by which the melt chamber of adhesive supplying means of the illustrative machine is maintained at a desired temperature. The electrical control circuit is so arranged that when the main control relay RC is energized, contacts RC/3 thereof are closed to make available a power supply to relay RH, which relay has contacts RH/1 in a 240 volt circuit in which heater elements H are incorporated. Energizing of relay RH is under the control of an amplifier AH which receives control signals from the microprocessor. The temperature of the melt chamber is sensed by a thermocouple which sends a signal in the form of a voltage to the analog/digital converter A/D, from which a signal is passed along the data bus DB to the microprocessor. The microprocessor operates in response to such signal. By controlling the power supply through contacts RC/3, any failure of the machine giving rise to a disabling signal to amplifier AC automatically also shuts down the heater means to the melt chamber.

The illustrative machine is provided with a digital display unit 30 (FIG. 1) on the control panel thereof which indicates, during the course of an operating cycle, to which amplifier a next control signal is to be supplied. In the event of a breakdown or fault occasioning a return of the illustrative machine to its initial condition, the display panel will continue to indicate the faulty amplifier giving rise to such termination. In this way, a factory mechanic, equipped with a suitable decoding table, can readily identify the area of fault and rectify it.

In a modification of the illustrative machine, the digital display unit 30 may be utilised for the setting of reference potentiometers RP and also for varying the temperature to which the melt chamber and also the wiper means (where the temperature thereof is controlled by the microprocessor) are respectively to be heated. To this end, whereas in general the display panel will only exhibit a code appropriate to a solenoid (or amplifier) being signalled by the microprocessor, the control circuit may be so arranged that whenever a reference potentiometer RP or a corresponding element of the heater means hereinbefore referred to is adjusted, the digital display unit becomes operative to exhibit a code corresponding to the particular setting of the potentiometer or like element, the code varying as the value of the voltage passing through the potentiometer varies. Thus, the operator may be provided with a code for the setting of each reference potentiometer for a given style of work and can now readily set the various reference potentiometers using the digital display unit 30.

Furthermore, the temperature control for the melt chamber heater means is preferably adjustable and the digital display unit 30 may be used also, in a manner similar to that used for monitoring adjustment of the reference potentiometers RP, for assisting in adjustment of said temperature control. Similarly, in said modification, the temperature control for the wiper means 28 is microprocessor-controlled and adjustable in like manner to the melt chamber temperature control.

Figure 3:
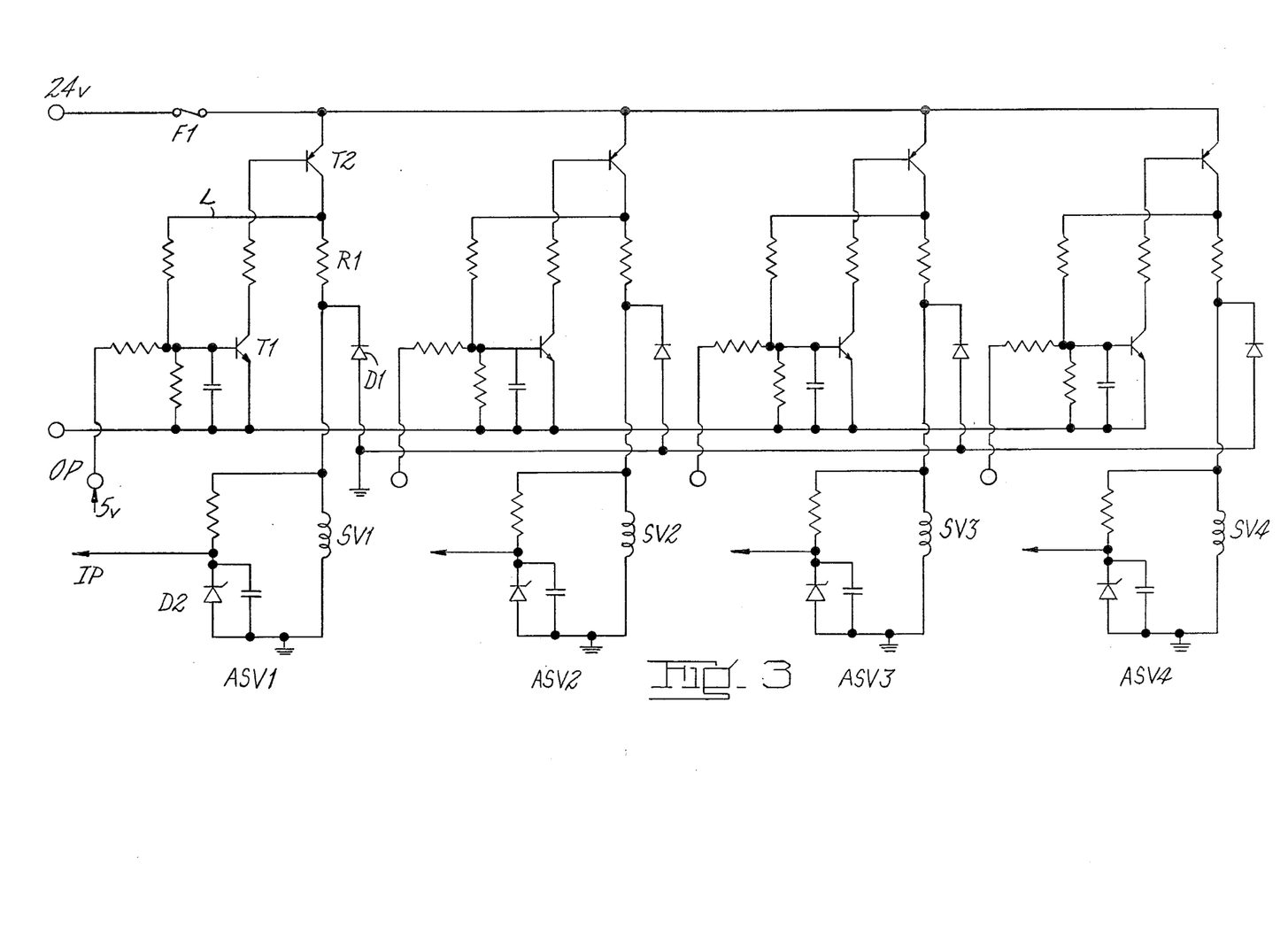
FIG. 3 is a diagram showing an amplifier board forming part of an output port of the control circuit of FIG. 1.
Figure 4:
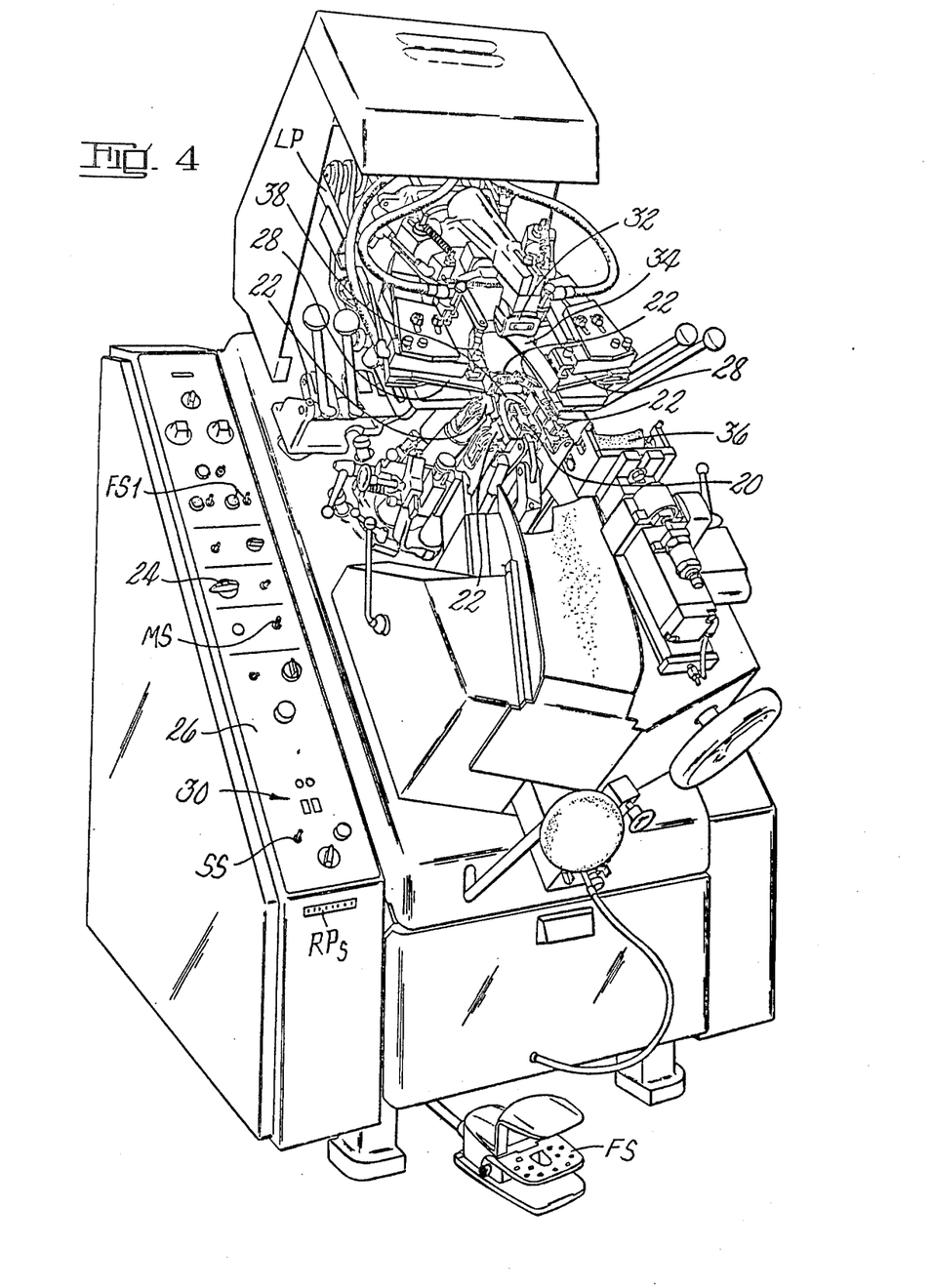
FIG. 4 is a perspective view of the illustrative machine.

FIG. 3 is a diagram of an amplifier board, comprising four amplifiers ASV 1 to 4. Two such boards are operatively connected to each output port OP. Each amplifier is associated with solenoid (SV 1 to 4). The board has a 24 volt (mean) power supply.

The amplifiers are the same in their arrangement and one, namely, ASVI, will now be described. The amplifier receives an input signal in the region of 5 volts from an output port OP, which signal fires transistor T1, and in turn this fires transistor T2. Firing T2 allows a voltage to pass to the solenoid SV1, whereupon the actuating means associated therewith is caused to operate.

The power supply to the board is an alternating current which is rectified (but not clipped). Removal of the signal from the microprocessor may take place at any point along the wave form, and the amplifier is arranged to be switched off at zero voltage. To this end, a line connects the emitter of T2 to the base of T1, therefore reinforcing the signal T1, but serving, when the microprocessor signal is discontinued, to ensure that T1 is switched off when the voltage of the power supply is zero. This arrangement is a type of positive feedback. In combination with diode D1 it ensures that no voltage spikes occur when the solenoid SV1 is switched off.

Associated with this solenoid SV1 is a feedback signal arrangement by which a signal is passed to an input port IP to indicate that the amplifier has been energized. (This signal will be supplied whether or not the amplifier was instructed to work, so that an amplifier fault will also be signalled as well as correct working thereof.) Since the voltage for energizing the solenoid is greater than that required for the signal, a zener diode D2 is incorporated to "clip" the pulsating signal to a maximum voltage of the order of 10 volts.

Located between T2 and SV1 is a resistance R1, having a resistance of 4.7 ohms. The transistor T2 can pass sufficient current to "drive" this resistance in the event of the solenoid being short-circuited. At the same time, however, the board has a fuse F1 which can pass sufficient current to the T2 transistors of the four amplifiers when all four solenoids associated therewith are working, but which will blow if any one of the soenoids is short-circuited.

More specifically, the level of current which will pass through T2 in the event of SV1 short-circuiting is of the order of 6 amps, which T2 can tolerate for a limited period, while the fuse F1 is rate at 2.5 amps.

In this way, a relatively inexpensive system is provided which protects the T2 transistors from burning out in the event of a short-circuit of an associated solenoid.

Having thus described our invention, what we claim as new and desire to secure by Letters Patent of the United States is:

1. A shoe upper conforming machine comprising:
a support by which a form, on which a shoe upper is to be conformed, can be supported with an insole held against the bottom thereof;
gripper means including a plurality of grippers each operable to grip a marginal portion of a shoe upper carried on a form supported by said support;
means for effecting relative movement between said support and the gripper means whereby, when the machine is in use and marginal portions of a shoe upper are being gripped as aforesaid, such upper can be caused to be tensioned over the form;
wiper means movable from a retractable position into an operative position in which, when the machine is in use, an upper tensioned as afforesaid can be held between the wiper means and an insole held against the bottom of the form;
actuating means for causing the wiper means to move between said positions as aforesaid;
gripper actuating means for operating each gripper to close to grip a marginal portion of a shoe upper as aforesaid; and
control means for controlling operation of both the actuating means for the wiper means and also the gripper actuating means, whereby the wiper means is caused to move from its retracted to its operative position and, when the machine is in use and with marginal portions of a shoe upper gripped and the upper tensioned as aforesaid, the grippers are caused to release such upper in timed relation with such movement of the wiper means, said control means comprising a computer control which supplies control signals sequentially, according to a programmed instruction, to the actuating means for the wiper means and to the gripper actuating means.

2. A shoe upper conforming machine comprising:
a support by which a form, on which a shoe upper is to be conformed, can be supported with an insole held against the bottom thereof;
gripper means including a plurality of grippers each operable to grip a marginal portion of a shoe upper carried on a form supported by said support;
means for effecting relative movement between said support and the gripper means whereby, when the machine is in use and marginal portions of a shoe upper are being gripped as aforesaid, such upper can be caused to be tensioned over the form;
wiper means movable from a retractable position into an operative position in which, when the machine is in use, an upper tensioned as aforesaid can be held between the wiper means and an insole held against the bottom of the form;
actuating means for causing the wiper means to move between said positions as aforesaid;
gripper actuating means for operating each gripper to close to grip a marginal portion of a shoe upper as aforesaid; and
control means for controlling operation of the gripper actuating means, to cause the grippers, when the machine is in use, to release marginal portions of a shoe upper gripped as aforesaid, in timed relation with the operation of the actuating means for the wiper means, by which the wiper means is moved from retracted to operative position, said control means comprising
signalling means for emitting a signal having a value which varies proportionately with the distance through which the wiper moves;
at least one reference signalling device associated with gripper means, each such device being arranged to emit a signal of constant value and;
a comparator which operates to compare the value of the signal of the signalling device with the values of the signals from the reference signalling devices and, in response to a matching of values of the signal from a reference signalling device with the signal from the signalling device, to actuate the gripper actuating means associated with such reference signalling device, thus to cause the gripper associated therewith to release the marginal portion of a shoe upper gripped thereby.

3. A pulling over and toe lasting machine comprising:
a last support by which a last, on which a shoe upper is to be conformed, can be supported, bottom down, with an insole held against the bottom thereof;
gripper means, including a plurality of grippers spaced apart in relation to the last support so as to enable marginal portions of the forepart of a shoe upper carried on a last supported by the last support to be gripped;
means for effecting relative movement between the last support and the gripper means whereby, with marginal portions of an upper forepart gripped as aforesaid, such forepart can be tensioned over its last;
wiper means movable from a retracted position into an operative position in which an upper, tensioned over its last as aforesaid, can be held between the wiper means and an insole held against the last bottom;
a presser member movable relative to the last support to hold the insole against such last bottom during the movement of the wiper means as aforesaid;
actuating means for causing the wiper means to move into operative position as aforesaid;
gripper actuating means for causing each gripper to close whereby the marginal portion of an upper inserted therein can be gripped as aforesaid;
presser member actuating means for moving the presser member to engage and hold an insole as aforesaid; and
control means for controlling operation of the actuating means for the wiper means, the gripper actuating means and the presser member actuating means in a desired sequence, whereby, with marginal portions of an upper forepart gripped and the upper thus tensioned as aforesaid, the presser member is caused to engage and hold the insole against the last bottom, and, as the wiper means moves into operative position, the grippers are caused to release the upper in timed relation with such movement of the wiper means, said control means comprising a computer control which supplies control signals sequentially, according to a programmed instruction corresponding to the desired sequence of operations, to said actuating means for the wiper means, the gripper actuating means and the presser member actuating means.

4. A pulling over and toe lasting machine comprising:
a last support by which a last, on which a shoe upper is to be conformed, can be supported, with an insole held against the bottom thereof;
first operating means whereby marginal portions of a shoe upper carried on a last can be gripped and such upper be tensioned over such last;
second operating means whereby, with the upper tensioned as aforesiad, the marginal portions thereof can be wiped over marginal portions of an insole held against the last bottom as aforesaid and second thereto; and
a computer control which supplies control signals sequentially, according to a programmed instruction corresponding to a desired sequence of operations, to various actuating means for the operating elements of both the first and the second operating means.

5. The pulling over and toe lasting machine of claim 4 further comprising:
an electrical control circuit which provides separate supplies of power to the first and second operating means, and which is so arranged that the supply of power to the second operating means is operatively connected to said second means only after the operating of the first operating means is completed, regardless of any control signal passed to the actuating means for any operating element of said second operating means prior to completion of the operation of the first operating means.

6. The pulling over and toe lasting machine of claim 5 wherein said control circuit further provides a periodic interrupt signal to said computer control, said computer control being responsive thereto to check the states of operating elements, said computer control being operative to provide a deactuate signal in the event of a detected failure of an operating element.

7. The pulling over and toe lasting machine of claim 6 wherein said control circuit further comprises:
means, responsive to the deactuate signal from said computer control, for deactuating the supply of power which is then being provided by the control circuit whereby the sequence of operation is thereby arrested.

8. The pulling over and tow lasting machine of claim 7 further comprising:
means, responsive to both the periodic signal from said control circuit and a later occurring signal from said computer control, for maintaining said deactivating means in a state whereby supply of power continues to be provided by the control circuit.

9. The pulling over and toe lasting machine of claim 7 further comprising:
means for heating the adhesive which is to be used by said wiper means; and
means for terminating the heating of the adhesive by said heating means in response to a deactuating of power.

10. The shoe upper conforming machine of claim 2 wherein the actuating means for the wiper means and the gripper actuating means are under computer control and are actuated each by a solenoid energized in response to a control signal from said computer control via an amplifier, and wherein a digital display unit is provided which exhibits an indicator appropriate to whichever solenoid was last in receipt of a control signal from said computer control.

11. The shoe upper conforming machine of claim 10 wherein the reference signalling devices associated with the gripper means are independently adjustable, and further wherein adjustment of a reference signalling device causes an indicator appropriate to the setting of said device, as it is being thus adjusted, to be exhibited on the digital display unit.

12. The shoe upper conforming machine of claim 10 comprising:
adhesive applying means for applying hot melt adhesive to marginal portions of an insole held against the bottom of the shoe support form, prior to operation of the wiper means as aforesaid, said means including a melt chamber and heater means therefor,
wherein a computer-controlled temperature control is provided for said melt chamber, said temperature control being adjustable, thus to vary the temperature to which the melt chamber is to be heated, and further wherein adjustment of said temperature control causes an indicator appropriate to the setting of said control, as it is being thus adjusted, to be exhibited on the digital display unit.

13. The shoe upper conforming machine of claim 12 wherein the wiper means is also heated, a further computer-controlled temperature control being provided which is adjustable, thus to vary the temperature to which the wiper means is to be heated, a further wherein adjustment of said further temperature control causes an indicator appropriate to the said of said further control, as it is being thus adjusted, to be exhibited on the digital display unit.

* * * * *